US009928195B2

(12) United States Patent
Tune et al.

(10) Patent No.: US 9,928,195 B2
(45) Date of Patent: Mar. 27, 2018

(54) INTERCONNECT AND METHOD OF OPERATION OF AN INTERCONNECT FOR ORDERED WRITE OBSERVATION (OWO)

(71) Applicant: ARM LIMITED, Cambridge (GB)

(72) Inventors: Andrew David Tune, Sheffield (GB); Peter Andrew Riocreux, Sheffield (GB); Sean James Salisbury, Sheffield (GB); Daniel Adam Sara, Sheffield (GB); George Robert Scott Lloyd, Sheffield (GB)

(73) Assignee: ARM Limited, Cambridge (GB)

( * ) Notice: Subject to any disclaimer, the term of this patent is extended or adjusted under 35 U.S.C. 154(b) by 187 days.

(21) Appl. No.: 14/959,170

(22) Filed: Dec. 4, 2015

(65) Prior Publication Data
US 2016/0203093 A1 Jul. 14, 2016

(30) Foreign Application Priority Data

Jan. 12, 2015 (GB) .................................. 1500442.7

(51) Int. Cl.
G06F 13/00 (2006.01)
G06F 13/36 (2006.01)
G06F 13/38 (2006.01)
G06F 13/42 (2006.01)
G06F 13/364 (2006.01)
(Continued)

(52) U.S. Cl.
CPC ........ *G06F 13/364* (2013.01); *G06F 12/0815* (2013.01); *G06F 13/404* (2013.01); *G06F 13/4282* (2013.01); *G06F 2212/621* (2013.01)

(58) Field of Classification Search
None
See application file for complete search history.

(56) References Cited

U.S. PATENT DOCUMENTS

2002/0147869 A1 10/2002 Owen et al.
2006/0075169 A1 4/2006 Harris et al.
2007/0067549 A1 3/2007 Gehman
(Continued)

OTHER PUBLICATIONS

Cassidy, "Designing an AMBA-based SoC with a PCI Express Interface", PCI SIG, PCT Express, Jun. 2011, 47 pages.
Dick, PCIe and AMBA Ordering Case Study, PCI SIG, PCI Express, 2013, 42 pages.
Fallin et al., "A High-Performance Hierarchical Ring On-Chip Interconnect with Low-Cost Routers", SAFARI Technical Report No. 2011-007, Sep. 6, 2011, 21 pages.
(Continued)

Primary Examiner — David E Martinez
(74) Attorney, Agent, or Firm — Nixon & Vanderhye P.C.

(57) ABSTRACT

An interconnect, and method of operation of an interconnect, are provided for connecting a plurality of master devices and a plurality of slave devices. Hazard management circuitry is used to serialize transactions to overlapping addresses. In addition, gating circuitry ensures ordered write observation (OWO) behavior at an interface to one or more of the master devices, the gating circuitry receiving write address transfers of write transactions and performing a gating operation to gate onward propagation of the write address transfers to the slave devices in order to ensure the OWO behavior. The gating circuitry performs the gating operation under control of the hazard management circuitry. Hence, for write transactions that are subjected to hazard checking by the hazard management circuitry, this removes the need to implement any other processes to specifically manage OWO behavior for those write transactions.

15 Claims, 5 Drawing Sheets

(51) Int. Cl.
*G06F 12/0815* (2016.01)
*G06F 13/40* (2006.01)

(56) References Cited

U.S. PATENT DOCUMENTS

2010/0250802 A1* 9/2010 Waugh ................ G06F 13/4022
710/100
2012/0290752 A1* 11/2012 Lim .................... G06F 13/1626
710/110

OTHER PUBLICATIONS

Sanchez et al., An Alanysis of On-Chip Interconnection Networks for Large-Scale Chip Mircoprocessors, ACM Transactions on Architecture and Code Optimization, vol. 7. No. 1, article 4, Published Apr. 2010, 28 pages.
Shwiebert, "Deadlock-Fee Oblivious Wormhole Routing with Cyclic Dependencies", Parallel and Distributed Computing Laboratory, Department of Electrical and Computer Engineering, Wayne State University, Appeared in the $9^{th}$ Annual ACM Symposium on Parallel Algorithms and Architectures, Jun. 22-25, 1997, 10 pages.
Volos et al., "CCNoC: Specializing On-Chip Interconnects for Energy in Cache-Coherent Servers", In Proceedings of the $6^{th}$ International Symposium on Networks-on-Chip (NOCS 2012), IEEE, May 2012, 8 pages.
Duato, "Interconnection Networks an Engineering Approach, Chapter 3 Deadlock, Livelock and Starvation" vol. 3, No. 9, 1997, pp. 124-127.
GB Search Report dated Jul. 1, 2015 in GB 1500442.7, 3 pages.

* cited by examiner

INTERCONNECT AND METHOD OF OPERATION OF AN INTERCONNECT FOR ORDERED WRITE OBSERVATION (OWO)

This application claims priority to GB Patent Application No. 1500442.7 filed 12 Jan. 2015, the entire contents is hereby incorporated by reference.

BACKGROUND

The present technique relates to an interconnect and to a method of operation of such an interconnect.

An interconnect can be used to connect a plurality of master devices with a plurality of slave devices in order to allow transactions to take place between those master devices and those slave devices. In some interconnects, there is a requirement for Ordered Write Observation (OWO) behaviour to be observed at the interface of the interconnect with at least one of the master devices. In respect of such an interface to a master device, OWO behaviour requires that if the master device is able to observe the results of a write transaction with a particular transaction identifier, it will also necessarily be able to observe the results of all other write transactions having the same transaction identifier that were issued before that write transaction.

Separate to the issue of maintaining OWO behaviour at one or more interfaces to the master devices, it is also known that interconnects typically need to incorporate deadlock avoidance circuits to ensure that transactions are processed through the interconnect in a way that will not give rise to deadlock situations occurring. As an example, it is known to monitor write response signals returned through the interconnect from the slave devices, and to use that write response information to determine when it is safe to allow new transactions to be issued through the interconnect. In known systems, the use of such deadlock avoidance schemes can also have the by-product of ensuring that the earlier mentioned OWO behaviour is observed.

However, deadlock avoidance circuitry reduces potential performance by increasing latency of write transactions, and may also be complex and costly to implement, and in some interconnects other structures can be incorporated to alleviate the potential for certain deadlock conditions. For example, it is known to provide write response re-order buffers to enable the order in which write response signals are returned to a master device to be re-ordered relative to the order in which they are received by the interconnect. This has the potential to significantly reduce the latency impact by reducing the extent to which the deadlock avoidance circuitry is required within the interconnect. However, it is still necessary to ensure any required OWO behaviour is observed, and this limits the potential reductions in latency when the deadlock avoidance circuitry is used to ensure OWO behaviour.

SUMMARY

In one example arrangement, there is provided an interconnect for connecting a plurality of master devices and a plurality of slave devices, comprising: hazard management circuitry to serialize transactions to overlapping addresses; and gating circuitry to ensure ordered write observation (OWO) behaviour at an interface to at least one of the master devices, the gating circuitry receiving write address transfers of write transactions and performing a gating operation to gate onward propagation of the write address transfers to the slave devices in order to ensure said OWO behaviour; the gating circuitry performing said gating operation under control of the hazard management circuitry.

In another example arrangement, there is provided a method of operating an interconnect to connect a plurality of master devices and a plurality of slave devices, comprising: employing hazard management circuitry to serialize transactions to overlapping addresses; receiving write address transfers of write transactions; performing a gating operation to gate onward propagation of the write address transfers to the slave devices in order to ensure ordered write observation (OWO) behaviour at an interface to at least one of the master devices; and performing said gating operation under control of the hazard management circuitry.

In a yet further example arrangement, there is provided an interconnect for connecting a plurality of master devices and a plurality of slave devices, comprising: hazard management means for serializing transactions to overlapping addresses; and gating means for ensuring ordered write observation (OWO) behaviour at an interface to at least one of the master devices, the gating means for receiving write address transfers of write transactions and for performing a gating operation to gate onward propagation of the write address transfers to the slave devices in order to ensure said OWO behaviour; the gating means for performing said gating operation under control of the hazard management means.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
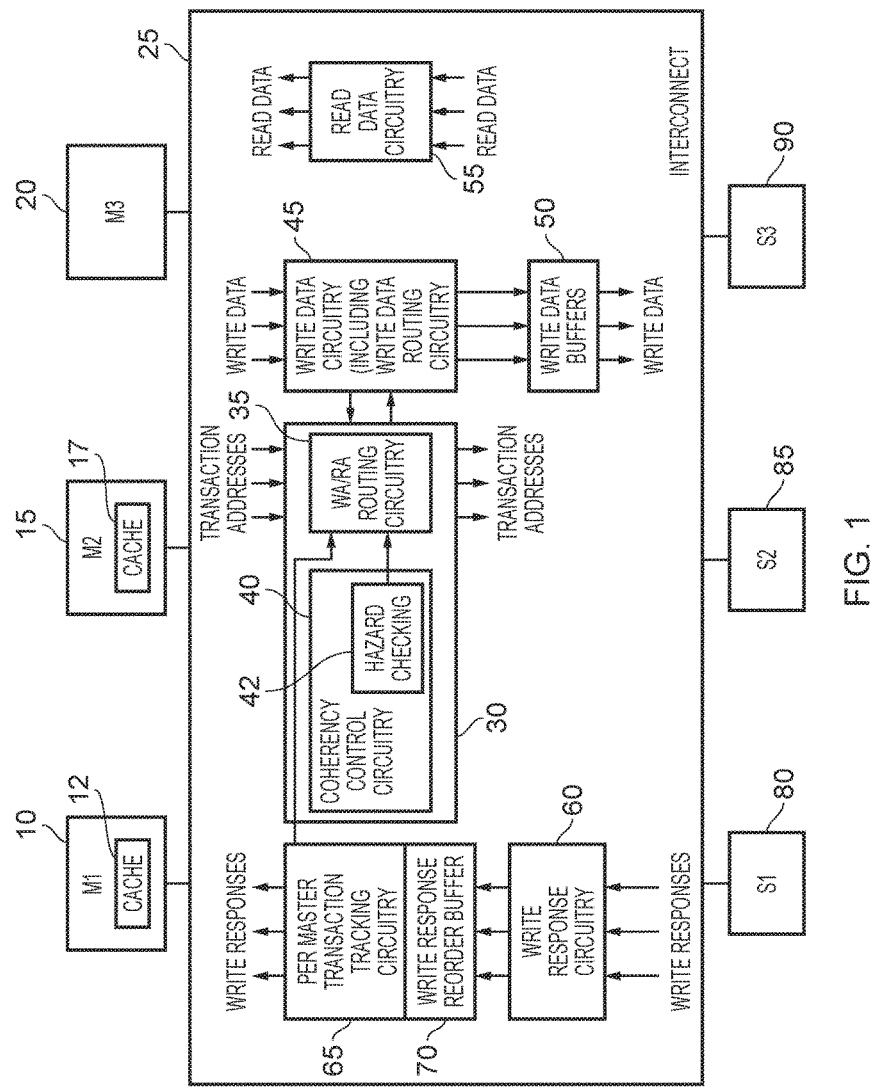
FIG. 1 is a block diagram of a data processing system in accordance with one embodiment.

Before discussing the embodiments with reference to the accompanying figures, the following description of embodiments is provided.

In accordance with one example embodiment, gating circuitry within the interconnect is used to ensure OWO behaviour at an interface to one or more of the master devices. In particular, the gating circuitry performs a gating operation to gate onward propagation of write address transfers of write transactions to the target slave devices for those write transactions in order to ensure the OWO behaviour. Further, hazard management circuitry is used to perform a hazard check in respect of transactions, in order to serialise transactions to overlapping addresses. The inventors have realised that where write transactions are subjected to the hazard checking procedures of the hazard management circuitry, then the gating operation required by the gating circuitry can be performed under control of the hazard management circuitry. Hence, the OWO behaviour can be ensured for such transactions without needing to utilise deadlock avoidance schemes to manage the OWO behaviour for those transactions. This can enable significant performance benefits to be realised by reducing the latency of write transactions. It also enables a reduction in cost and complexity of the interconnect in situations where certain deadlock conditions can be removed, and accordingly associated deadlock avoidance circuitry is not required, since there is no longer any need to still incorporate that deadlock avoidance circuitry merely to handle the OWO behaviour for such write transactions provided they are hazard checked by the hazard management circuitry. Hence this enables reliance on the use of deadlock avoidance schemes to enforce OWO behaviour for such write transactions to be avoided.

In one embodiment, suitable hazard management circuitry may already be provided within the interconnect for other reasons. For example, where at least one of the master devices has an associated cache structure, the interconnect may need to implement cache coherency control mechanisms in order to ensure that all of the devices are able to see the most up to date version of any cache data within those cache structures. In particular, in one embodiment the interconnect may further comprise coherency control circuitry to perform cache coherency control operations for coherent transactions received by the interconnect from the master devices, the hazard management circuitry being associated with the coherency control circuitry and being employed to serialize coherent transactions to overlapping addresses. The gating circuitry may then be arranged, for coherent write transactions, to perform said gating operation under control of the hazard management circuitry.

Hence, in such an embodiment, any coherent write transactions will already be processed by the hazard management circuitry as part of the cache coherency control operations. Hence, for such coherent write transactions, the gating circuitry can merely perform the gating operation under control of the hazard management circuitry in order to ensure OWO behaviour for such coherent write transactions.

In one embodiment, whilst non-coherent write transactions do not need to be processed by the hazard management circuitry for cache coherency control reasons, the interconnect could be arranged nevertheless to pass such non-coherent write transactions through the hazard management circuitry in order to ensure OWO behaviour for those non-coherent write transactions.

However, the hazard management circuitry represents a relatively costly resource, and accordingly in alternative embodiments it may be desired not to employ the hazard management circuitry in respect of any non-coherent write transactions. Instead, in one embodiment, the interconnect may further comprise transaction tracking circuitry to track write response signals received from the slave devices in response to write transactions issued from the interconnect to said slave devices. For non-coherent write transactions, the transaction tracking circuitry may then be arranged to issue an OWO control signal to the gating circuitry to control performance of said gating operation for said non-coherent write transactions. Hence, for non-coherent write transactions, the gating operation required to ensure OWO behaviour can be performed on the basis of an OWO control signal issued by the transaction tracking circuitry.

In one embodiment, each transaction has a transaction identifier associated therewith, and the transaction tracking circuitry is arranged to control issuance of the OWO control signal to the gating circuitry dependent on the write response signals, in order to ensure that the address transfer of a non-coherent write transaction is not propagated beyond the gating circuitry until the write response signals associated with all preceding write transactions with the same transaction identifier have been observed.

In one embodiment, each slave device is constrained to implement OWO behaviour with regard to the write transactions that that slave device processes. In such situations, the transaction tracking circuitry is further able to limit the number of non-coherent write transactions that it needs to monitor, i.e. the number of non-coherent write transactions that it needs to issue an OWO signal for. In particular, in one embodiment, the transaction tracking circuitry is arranged to issue the OWO signal so as to only control propagation beyond the gating circuitry of non-coherent write transactions that are issued to a slave device that is different from the slave device of the most recently preceding non-coherent write transaction having the same transaction identifier.

By such an approach, a significant reduction in average forward latency of write transactions can be achieved, since there are only a relatively small number of write transactions that need to be gated by the transaction tracking circuitry. Indeed, it will be understood that when all of the write transaction traffic is coherent, there will be no need for the transaction tracking circuitry to perform any gating of write transactions.

In some embodiments, certain non-coherent write transactions may cause a series of units of write data to be written across multiple slave devices. Herein, such write transactions will be referred to as write hashing transactions. A particular example of a hashing transaction is a striping transaction, where the write data units are written in a striped manner across the multiple slave devices. In one embodiment, the transaction tracking circuitry is arranged when considering a current non-coherent write transaction, if the most recently preceding non-coherent write transaction having the same transaction identifier is a non-coherent write hashing transaction, to treat the current non-coherent write transaction as being issued to a slave device that is different from the slave device of that most recently preceding non-coherent write transaction. Hence, irrespective of which slave device the final data unit of the non-coherent write hashing transaction is being written to, the transaction tracking circuitry will consider a current non-coherent write transaction as being issued to a slave device that is different from the slave device of that write hashing transaction, hence invoking the transaction tracking circuitry to implement the OWO behaviour for that current non-coherent write transaction.

There are a number of ways in which the transaction tracking circuitry can determine when to issue the OWO signal. In one embodiment, the transaction tracking circuitry controls issuance of the OWO signal by implementing a deadlock avoidance scheme. However, as will be apparent from the above discussion, for OWO purposes the use of such a deadlock avoidance scheme can be restricted to non-coherent write transactions, and in certain embodiments to only a subset of the non-coherent write transactions.

The deadlock avoidance scheme can take a variety of forms, but in one embodiment it is one of a single transaction scheme, a single transaction per transaction identifier scheme, or a single route per transaction identifier scheme.

In one embodiment, further reductions in the number of non-coherent write transactions that need to have their issuance controlled by the transaction tracking circuitry in order to ensure OWO behaviour can be achieved. In particular, in one embodiment, for a non-coherent write transaction, if all of the preceding write transactions with the same transaction identifier whose write responses have not yet been observed are coherent write transactions, the transaction tracking circuitry may be arranged not to control propagation beyond the gating circuitry of that non-coherent write transaction. In particular, the inventors have observed that a non-coherent write transaction cannot possibly have its results observed until it is issued, and if all of the preceding write transactions with the same transaction identifier whose write responses have not yet been observed are coherent write transactions, then all of those transactions will automatically exhibit the required OWO behaviour by virtue of the use of the hazard management circuitry in connection with those coherent write transactions. Hence, this guarantees that this "first" non-coherent write transaction will exhibit the required OWO behaviour without any gating in dependence on the transaction tracking circuitry.

In one embodiment, the interconnect further comprises a write response reorder buffer to enable write response signals received by the interconnect to be returned to the master devices in an order different to the order of receipt of said write response signals by the interconnect. When a write response re-order buffer is used, this can significantly reduce the number of potential deadlock situations, and hence enables a significant reduction in latency that would otherwise arise through use of the deadlock avoidance circuitry. When adopting the earlier described techniques for handling OWO behaviour, this then enables those potential latency reductions to be more readily achieved, through the reduction in reliance on the deadlock avoidance circuitry to manage the OWO behaviour. This can then give rise to significant performance improvements through the above-mentioned reduction in the latency of write transactions.

The transaction identifiers can take a variety of forms, but in one embodiment the transaction identifiers are arranged to be different for transactions from different master devices. In some embodiments, the master devices can be arranged to use unique transaction identifiers. Alternatively, the original transaction identifiers specified by the master devices can be supplemented by the interconnect in order to ensure that the transaction identifiers as used by the interconnect are different for transactions from different master devices.

In one embodiment, deadlock avoidance circuitry is required within the interconnect to manage the way in which write address transfers of a write transaction, and the associated write data of that write transaction are processed through the interconnect. In particular, the deadlock avoidance circuitry needs to ensure that a write address of a write transaction cannot be issued through the interconnect until it can be guaranteed that its associated write data can be routed to the target slave device. This is necessary to prevent a cyclic dependency caused by a potentially reconvergent path downstream. Known techniques for seeking to deal with this potential deadlock situation can give rise to significant latency issues, by not attempting to issue the write address transfer of a write transaction until the first unit of its associated write data is also available, or by not attempting to issue the write address transfer of a write transaction until all of the write data associated with preceding transactions sent to different slave devices have been issued. In accordance with one embodiment, this latency is significantly reduced by a modified deadlock avoidance mechanism.

In particular, in one embodiment the interconnect further comprises: write data routing circuitry to route write data through the interconnect; deadlock avoidance circuitry to gate onward propagation of write address transfers of write transactions to the slave devices in order to ensure that the write address transfer of a write transaction is not propagated beyond a gating point within the interconnect until it is guaranteed that the write data of a preceding write transaction being performed in respect of a different slave device cannot block the write transaction's associated write data within the write data routing circuitry; and write data tracking circuitry arranged for a write address transfer of a current write transaction propagated beyond the gating point, to determine a write data size of the associated write data of that current write transaction and a write data route for the associated write data, and determine having regard to the write data route and the write data size presence of a condition that guarantees that the associated write data of that current write transaction will be propagated through the write data routing circuitry; the write data tracking circuitry being arranged in response to detection of said condition to issue a release signal to the deadlock avoidance circuitry to allow the write address transfer of a next write transaction to pass beyond the gating point.

Hence, in accordance with the above embodiment, write data tracking circuitry is used to determine a point at which it can be guaranteed that the associated write data of a current write transaction will not be held up within the write data routing circuitry, and hence cannot block the write data associated with the next write transaction. At that point, write data tracking circuitry is arranged to issue a release signal to the deadlock avoidance circuitry to then allow the write address transfer of a next write transaction to pass beyond the gating point. This allows a significantly earlier issuance of the write address transfer of a next write transaction than in accordance with known techniques, and accordingly allows a significant reduction in latency of write transactions, whilst still ensuring the potential deadlock condition is avoided.

In one embodiment, the interconnect further comprises write data buffer circuitry located between the write data routing circuitry and the slave devices for buffering write data prior to delivery to the slave devices, the write data tracking circuitry being arranged to monitor available space within the write data buffer circuitry for the write data route in order to determine as said condition a point where the remaining write data of the current write transaction is guaranteed to be accommodated within the write data buffer circuitry. Hence, in this embodiment, the write data tracking circuitry can determine when the available space within the relevant write data buffer(s) is sufficient to accommodate the remaining write data of the current write transaction, at which point the release signal can be issued. Hence, the above described technique does not wait until the last unit of write data has actually been issued, but instead determines when it can be guaranteed that the final unit of data will be able to issue unimpeded through the write data routing circuitry even if it has not done so already. At that point it is safe to issue the release signal even though the final unit of data of the current transaction has not passed through the write data routing circuitry, hence significantly reducing latency. In particular, this early release signal releases the gating on the write address of a next, different destination, write transaction.

Typically, the release process will take some time, but the early issuance of the release signal allows that release mechanism to proceed whilst the current write transaction's write data is issued and passes through the write data routine circuitry, and allows the write address for the next write transaction to issue before the last write data has passed through the write data routing circuitry, thus allowing the next transaction's write data to begin to be routed through the interconnect with a significantly reduced latency.

The write data buffer circuitry can take a variety of forms but in one embodiment comprises a separate write buffer for each slave device.

Particular embodiments will now be described with reference to the figures.

FIG. 1 shows a data processing system in accordance with one embodiment, which may for example be embodied as an integrated circuit. An interconnect 25 is provided for interconnecting a plurality of master devices 10, 15, 20 with a plurality of slave devices 80, 85, 90. The interconnect 25 controls the interconnecting of the various master and slave devices in order to enable transactions to take place between the master and slave devices. A transaction will typically involve an address transfer from a master device to a particular slave device through the interconnect, followed by one or more data transfers in order to pass data between the master and slave device. For a write transaction, the write data will pass from the master device to the slave device, whilst for a read transaction the data will be returned from the slave device to the master device. For write transactions, in one embodiment write responses are also returned from the slave device to the master device to provide transaction status information to the relevant master device at the end of a write transaction, for example indicating whether the transaction completed successfully, whether an error occurred, etc.

The transaction addresses are routed through the address circuitry 30, which includes not only routing circuitry 35 for routing the various write addresses of write transactions and read addresses of read transactions through the interconnect from the relevant master device to the relevant slave device, but also associated control circuits. Similarly, the write data of write transactions is routed through the write data circuitry 45 which includes write data routing circuitry and associated control elements, whilst the read data of read transactions is returned through the read data circuitry 55, which again will include routing circuits and associated control elements. In one embodiment, write data buffers 50 are also provided in the path between the write data circuitry 45 and the slave devices to enable write data to be buffered prior to onward propagation to the relevant slave device.

Write response circuitry 60 is used to route the various write responses returned from the slave devices to the relevant master devices, the write response traffic also being routed through per master transaction tracking circuitry 65 prior to onward transmission to the master devices. The per master transaction tracking circuitry is arranged, for each master device, to maintain information about the status of all non-completed transactions, that information being used to set flags which are referenced by various of the other illustrated components in order to control the flow of address traffic and data traffic through the interconnect. As shown in FIG. 1, in one embodiment the per master transaction tracking circuitry 65 may incorporate a write response re-order buffer 70 to enable write response signals received by the interconnect to be returned to the master devices in an order different to the order of receipt of those write response signals. By using a write response re-order buffer, it is possible to remove a number of potential deadlock situations that might otherwise arise, and hence reduce the latency that would otherwise be incurred due to the need to use deadlock avoidance circuitry within the transaction tracking circuitry 65 to handle those potential deadlock situations.

Where one or more of the master devices have associated cache structures, then it is known to provide coherency control circuitry 40 within the interconnect to perform cache coherency operations in order to ensure that the various devices connected to the interconnect all see the most up to date version of any particular data value. In the example illustrated in FIG. 1, it is assumed that master devices 10 and 15 have associated cache structures 12, 17. Although the master device 20 is shown as not having an associated cache structure, its transactions will also typically need to be subjected to the cache coherency control operations if they relate to shareable address ranges (such region attributes typically being defined in the memory management unit (MMU) page tables), and accordingly where there is the potential that the data being accessed may reside in one of the cache structures 12, 17 associated with the other master devices 10, 15.

The transactions issued by the master devices can be classified as either coherent transactions or non-coherent transactions. Coherent transactions need to be subjected to the coherency control operations of the coherency control circuitry 40, whilst non-coherent transactions do not. An example of a coherent transaction would be a transaction that specified an address within a shareable region of memory, whereas an example of a non-coherent transaction would be a transaction that specified an address that is not within a shareable region of memory, and accordingly where the associated data cannot reside within one of the cache structures 12, 17.

The coherency control circuitry includes hazard checking circuitry 42 for performing hazard detection operations and controlling the ordering and timing of issuance of address transfers through the address routing circuitry 35 having regard to the detected hazard conditions. In particular, the hazard checking circuitry 42 detects transactions to overlapping addresses and ensures that those transactions are serialised in order to avoid potential hazard conditions arising. This hazard checking may be performed not only in respect of the actual transactions issued by the master devices, but also in association with any snooping transactions that may be issued by the coherency control circuitry as part of the cache coherency operations. In particular, where the coherency control circuitry determines that one of the cache structures 12, 17 may hold the data that a current transaction is seeking to access, then it may initiate a snoop transaction to one or more of those caches in order to perform a lookup operation to determine whether the required data is in fact stored within the cache, and such snoop transactions can also be monitored by the hazard checking circuitry.

Interconnects typically need to incorporate deadlock avoidance circuitry to ensure that transactions are processed through the interconnect in away that will not give rise to deadlock situations occurring. As a particular example of one type of deadlock avoidance circuitry, it is known to provide deadlock avoidance circuitry within the transaction tracking circuits to monitor write response signals returned through the interconnect from the slave devices, and to use that write response information to determine when it is safe to allow new transactions to be issued through the interconnect. This can be used to control one or more elements within the address routing circuitry 35 so as to allow the relevant address transfers to be propagated once the potential deadlock situations are considered no longer to be present. However, in embodiments where a write response re-order buffer 70 is provided, this can significantly alleviate such potential deadlock situations, and enable use of deadlock avoidance circuitry within the tracking circuitry 65 to be significantly reduced, thereby reducing latency of write transactions.

However, as mentioned earlier, separately to the issue of deadlock avoidance, there is often a requirement for ordered write observation (OWO) behaviour to be observed at an interface of the interconnect with at least one of the master devices, and often this behaviour is required in respect of multiple of those master devices. Whilst it is known that certain deadlock avoidance schemes, such as those that might be implemented within the transaction tracking circuitry in respect of write response traffic, can be used to ensure that OWO behaviour is enforced, this can give rise to significant latency issues in respect of the processing of the write transactions, particularly in situations where those deadlock avoidance schemes are no longer needed for deadlock avoidance management.

In particular, if the above mentioned deadlock avoidance mechanism is used to enforce OWO behaviour, it imposes a forward latency penalty on a transaction (and those transactions that follow it) when that transaction's destination is different from that of the previous transaction with the same transaction identifier (transaction ID). In particular, the transaction to the new destination cannot be issued until all preceding writes with the same transaction ID are complete downstream.

As write addresses cannot be re-ordered without requiring significant capability to re-order write data, any restriction on issue of a transaction imposes a restriction on issue of all following transactions (not just those with the same transaction ID as is the case for read transactions), and can hence give rise to significant latency issues for such write transactions.

In accordance with one embodiment, a different mechanism is used to handle OWO behaviour for at least some of the transactions passing through the interconnect, thereby reducing reliance on use of deadlock avoidance schemes for that purpose, and reducing write transaction latency within the interconnect.

The inventors have realised that in a system employing a cache coherency control mechanism, the hazarding mechanism of that cache coherency control mechanism can be used to guarantee OWO behaviour. In particular, it is the case that a read operation performed in respect of a coherent location cannot return a response (and therefore observe that location) whilst a coherent write transaction to an overlapping address with that coherent location has been issued, and the relevant master device has not acknowledged the write response for that coherent write transaction. That acknowledgement from the master will not occur until the write transaction's write response has been issued from the interconnect to the master, which in turn will not occur until all preceding transactions with the same transaction ID have had their write response returned to the master device. Accordingly, the inventors realised that observation of a coherent write transaction inherently requires observation of all preceding write transactions with the same transaction identifier (whether coherent or not) without needing to restrict the issuance of the address transfer of that coherent write transaction using the deadlock avoidance mechanism. Instead, the implementation of the hazard checking mechanism in respect of coherent transactions will inherently ensure that OWO behaviour is observed for coherent write transactions.

In one embodiment, the transaction tracking circuitry 65 hence only needs to implement a deadlock avoidance style mechanism in respect of non-coherent write transactions in order to ensure that OWO behaviour is also observed for the non-coherent write transactions. This can lead to a significant reduction in the overall latency of handling write transactions within the interconnect, since only the non-coherent write transactions need to be stalled by the deadlock avoidance mechanism. Further, it is found that not all non-coherent transactions need to stalled in that manner, and instead the only non-coherent transactions that need to be stalled using a deadlock avoidance mechanism are those that are issued to a destination that is different from the most recent preceding non-coherent write transaction with the same transaction identifier.

The way in which OWO behaviour is enforced in accordance with one embodiment will now be discussed further with reference to FIG. 2.

Figure 2:
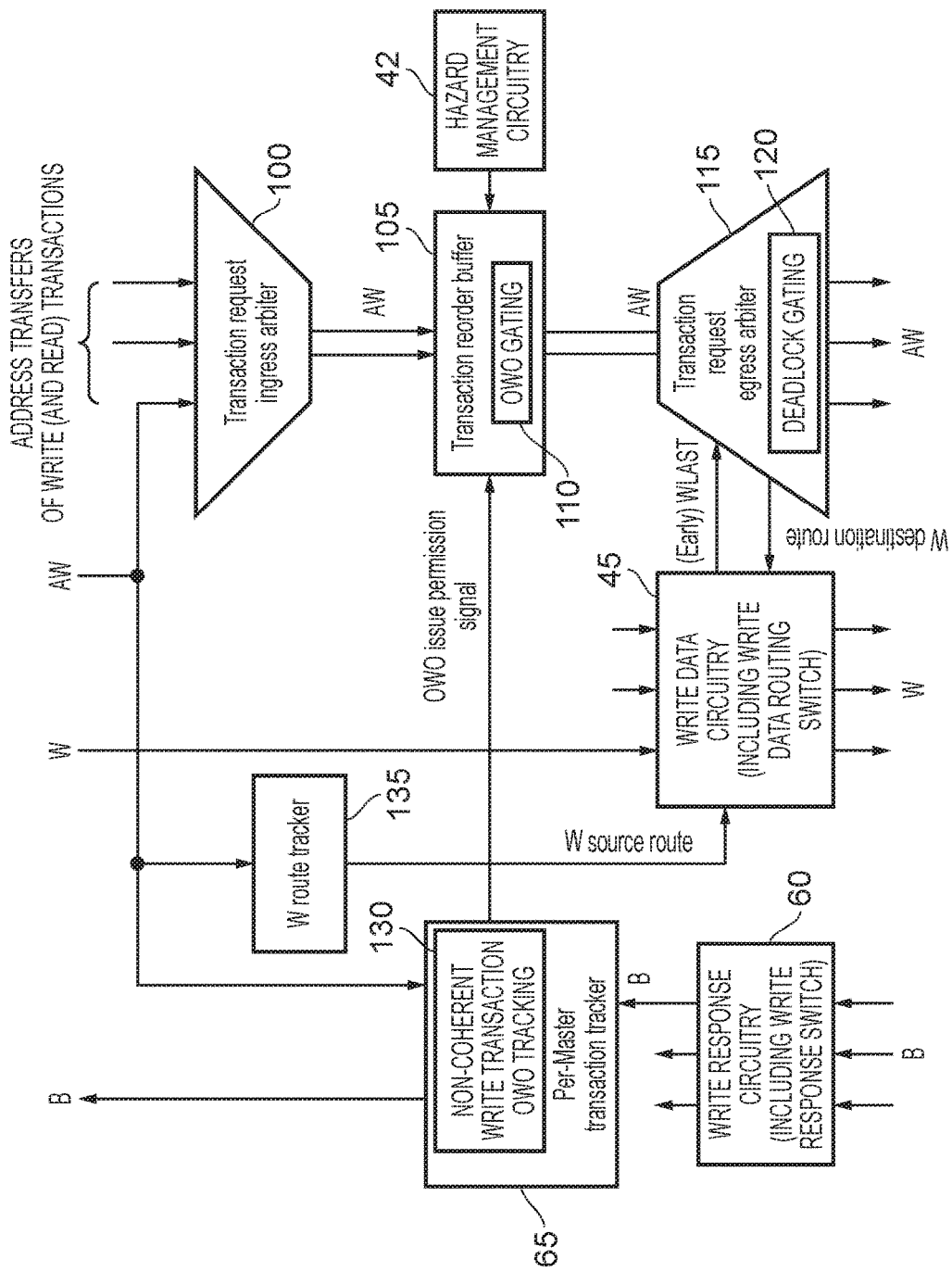
FIG. 2 illustrates in more detail the interaction between various components provided within the interconnect in accordance with one embodiment.

As shown in FIG. 2, in one embodiment the write address/read address routing circuitry 35 includes a transaction request ingress arbiter 100, a transaction re-order buffer 105 and a transaction request egress arbiter 115. The address transfers of read and write transactions issued from the master devices are received by the transaction request ingress arbiter 100, which employs an arbitration scheme in order to decide when to route those address transfers on to the transaction re-order buffer 105. As discussed earlier, for any coherent transactions, the hazard management circuitry 42 will perform hazard checking operations in respect of those coherent transactions, and will only allow the address transfer of a transaction to be propagated on by the transaction re-order buffer once all hazards for that transaction are cleared.

The per master transaction tracker 65 is responsible for maintaining state information about all of the non-completed transactions from the associated master, and based on that maintained state information will set and clear various flags that are used by elements within the interconnect to control the transfer of address and data information through the interconnect. With regard to FIG. 2, the transaction re-order buffer 105 will determine from the state of those flags which transactions in its buffer are coherent, which of those coherent transactions has reached a point where they can be hazard checked, which of those transactions have been hazard checked, and whether the hazard checking is passed. Only once the hazard checking has been passed for a particular coherent transaction, will it be able to be issued from the transaction re-order buffer.

The transaction re-order buffer 105 also implements an OWO gating function 110, and in particular performs a gating operation to gate onward propagation of write address transfers to the slave devices in order to ensure that OWO behaviour is enforced. As discussed earlier, for a coherent write transaction, this can be guaranteed to be the case by the time that coherent write transaction has passed its hazard checking processes, and accordingly the OWO gating operation can be performed directly under the control of the hazard management circuitry 42 for such coherent write transactions.

Whilst the hazard management circuitry 42 would not typically be used for non-coherent write transactions, since it is implemented as part of the coherency control circuitry reserved for use in association with coherent transactions, in one embodiment it would be possible to extend the hazard checking operation so as to also perform hazard checking in respect of non-coherent transactions. This would ensure that all of the required OWO gating functionality could be achieved directly dependent on the operation of the hazard management circuitry. However, in an alternative embodiment, non-coherent transactions are not monitored by the hazard management circuitry, and instead the per master transaction tracker 65 implements the necessary mechanism to ensure OWO behaviour in respect of non-coherent write transactions. In particular, it includes circuitry 130 to track non-coherent write transactions in order to determine when an issue permission signal can be issued to the transaction re-order buffer 105 in respect of a pending non-coherent write transaction in order to indicate to the transaction re-order buffer that it is now safe to propagate that non-coherent write transaction's address through the OWO gating function 110 of the re-order buffer and on to the transaction request egress arbiter 115.

In particular, in one embodiment, the tracking circuitry 130 will only issue an OWO permission signal to the transaction re-order buffer 105 in respect of a non-coherent write transaction once the write response signals associated with all preceding write transactions with the same transaction identifier have been observed. In one embodiment each slave device will be constrained to implement OWO behaviour with regard to the write transactions that that slave device processes. In such situations, the transaction tracking circuitry 130 is further able to limit the number of non-coherent write transactions that it needs to monitor and issue OWO permission signals for. In particular, it may only be required to issue OWO permission signals for non-coherent write transactions that are issued to a slave device that is different from the slave device associated with the most recently preceding non-coherent write transaction having the same transaction identifier.

In one embodiment, a yet further reduction in the number of non-coherent write transactions that need to have their issuance controlled by the OWO tracking circuitry 130 can be achieved. In particular, if when considering a particular non-coherent write transaction, all of the preceding write transactions with the same transaction identifier whose write responses have not yet been observed are coherent write transactions, there will be no need to gate the onward propagation of the address transfer of that non-coherent write transaction from the re-order buffer 105 using an OWO permission signal. This is due to the fact that since a non-coherent write cannot possibly be observed until it is issued, and once it is issued all preceding coherent write transactions will already have set up their hazard checking procedures and therefore can be guaranteed to be observed, then OWO behaviour for that non-coherent write is inherently guaranteed given that it is guaranteed that all of the preceding coherent writes with the same transaction ID will be observable at that point.

In one embodiment, separate to the issue of OWO behaviour enforcement, deadlock avoidance circuitry is still required within the interconnect to manage the way in which write address transfers of a write transaction, and the associated write data of that write transaction are processed through the interconnect. In particular, the transaction request egress arbiter 115 will incorporate some deadlock gating functionality 120 that will gate the output of an address transfer of an address transaction dependent on one or more control signals received from the write data circuitry 45. In particular, the deadlock avoidance circuitry needs to ensure that a write address of a write transaction cannot be issued through interconnect until it can be guaranteed that its associated write data can be routed to the target slave device. This is necessary to prevent a cyclic dependency caused by a potentially reconvergent path downstream.

In accordance with one embodiment a mechanism is provided which enables the necessary control signals to be issued significantly earlier than was previously possible, thereby reducing the latency in the handling of write transactions whilst still performing the required deadlock avoidance checking. In particular, the routing of write data through write data routing circuitry within block 45 is performed based on source route information provided by a route tracker 135 and destination route information forwarded from the transaction request egress arbiter. Once the destination route information has been provided, circuitry within block 45 can track the availability of buffering resources downstream, such as the write data buffers 50 shown in FIG. 1, and taking into account the size of the write data to be transferred can determine when it can be guaranteed that the final unit of that write data will be passed through the write data routing switch unimpeded. At this point, it can be guaranteed that the processing of the write data for that current write transaction will not impede the propagation through the write data routing circuitry of the write data of a subsequent write transaction directed to a different slave device. Accordingly, a control signal (Early WLAST) can be issued from the write data circuitry to that effect, which can be used by the deadlock gating function 120 within the transaction request egress arbiter 115 in order to decide when an address transfer of a next write transaction can be output.

Figure 3:
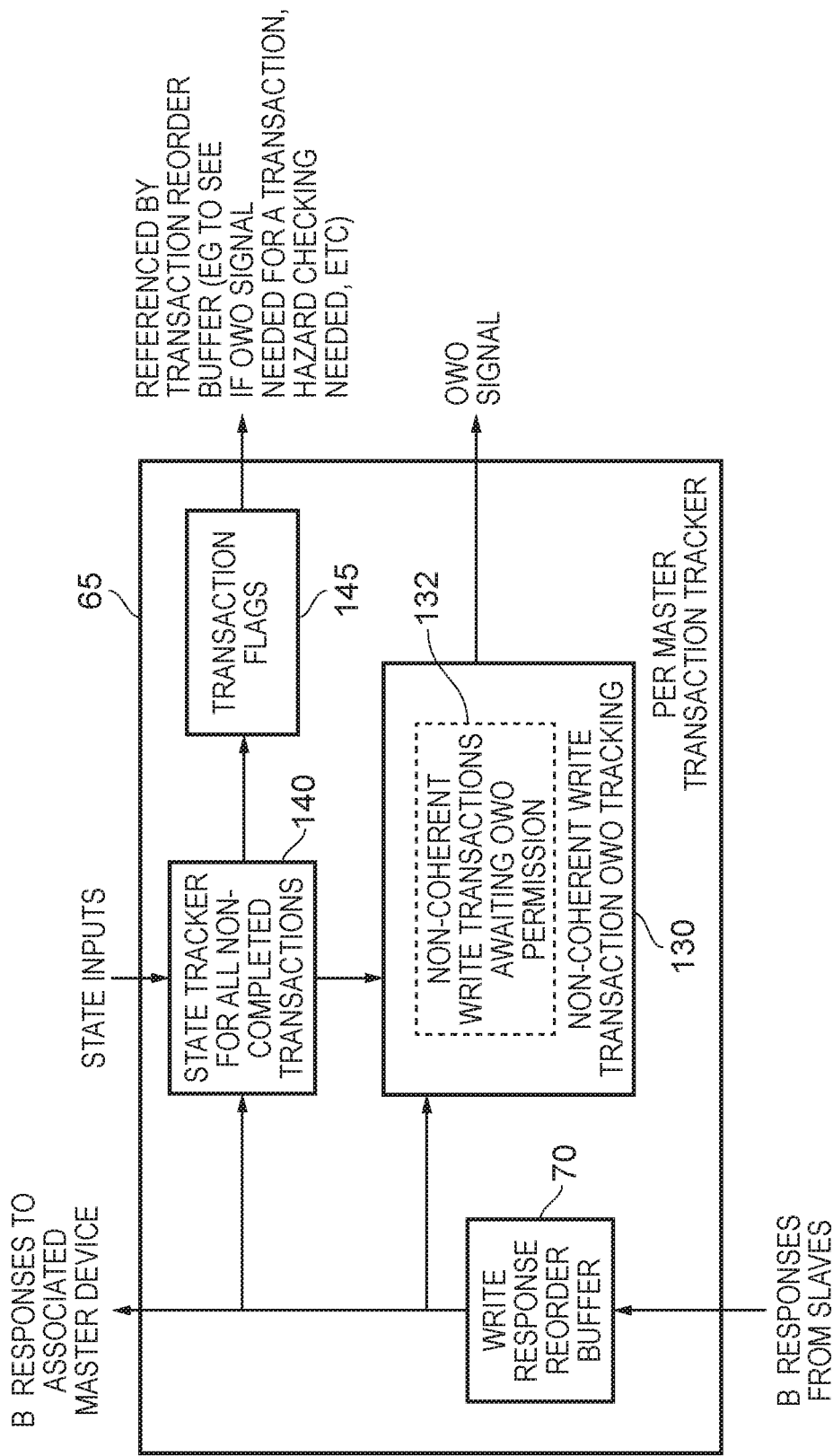
FIG. 3 is a block diagram illustrating in more detail some of the functions performed by the per master transaction tracker of FIGS. 1 and 2 in accordance with one embodiment.

Returning to the discussion of enforcing OWO behaviour, FIG. 3 is a block diagram illustrating in more detail components provided within the per master transaction tracker 65. In particular, state tracking circuitry 140 is provided for all non-completed transactions, in order to keep track of the current state of each such transaction within the interconnect. It will receive various inputs during the course of processing of the transaction within the interconnect in order to enable it to update the state, and based on the current state will maintain a set of transaction flags 145. These flags are used by various components within the interconnect in order to control the decisions that those components take with regard to propagation of transaction addresses and transaction data. For example, the transaction re-order buffer 105 will reference the transaction flag information 145 in order to determine, for a current pending transaction in its buffer, whether that transaction needs to be held back from issue until hazard checking has been passed, or whether it is a transaction for which an OWO issue permission signal is required from the non-coherent write transaction OWO tracking circuitry 130. The non-coherent write transaction OWO tracking circuitry 130 is arranged to monitor the non-coherent write transactions that are awaiting OWO permission (indicated by the dotted box 132 in FIG. 3). The details of those transactions can be maintained locally within the non-coherent write transaction OWO tracking circuitry 130, or can be determined on the fly with reference to the state tracking information 140.

The non-coherent write transaction OWO tracking circuitry 130 can also keep track of the state of all of the non-completed transactions, and in particular can track the state of those transactions that are preventing the OWO issue permission signal being issued in respect of a particular non-coherent write transaction. Hence, for example, for a particular non-coherent write transaction for which an OWO permission signal needs to be issued, it can detect the situation where the most recent preceding same transaction ID non-coherent write transaction was sent to a different slave device, and can await receipt of the write response signal in respect of that most recent preceding write transaction before issuing the OWO permission signal for the non-coherent transaction that it is monitoring. In one embodiment, the non-coherent write transaction OWO tracking circuitry 130 is arranged to monitor the write responses output from the write response re-order buffer 70 for his purpose.

Figure 4:
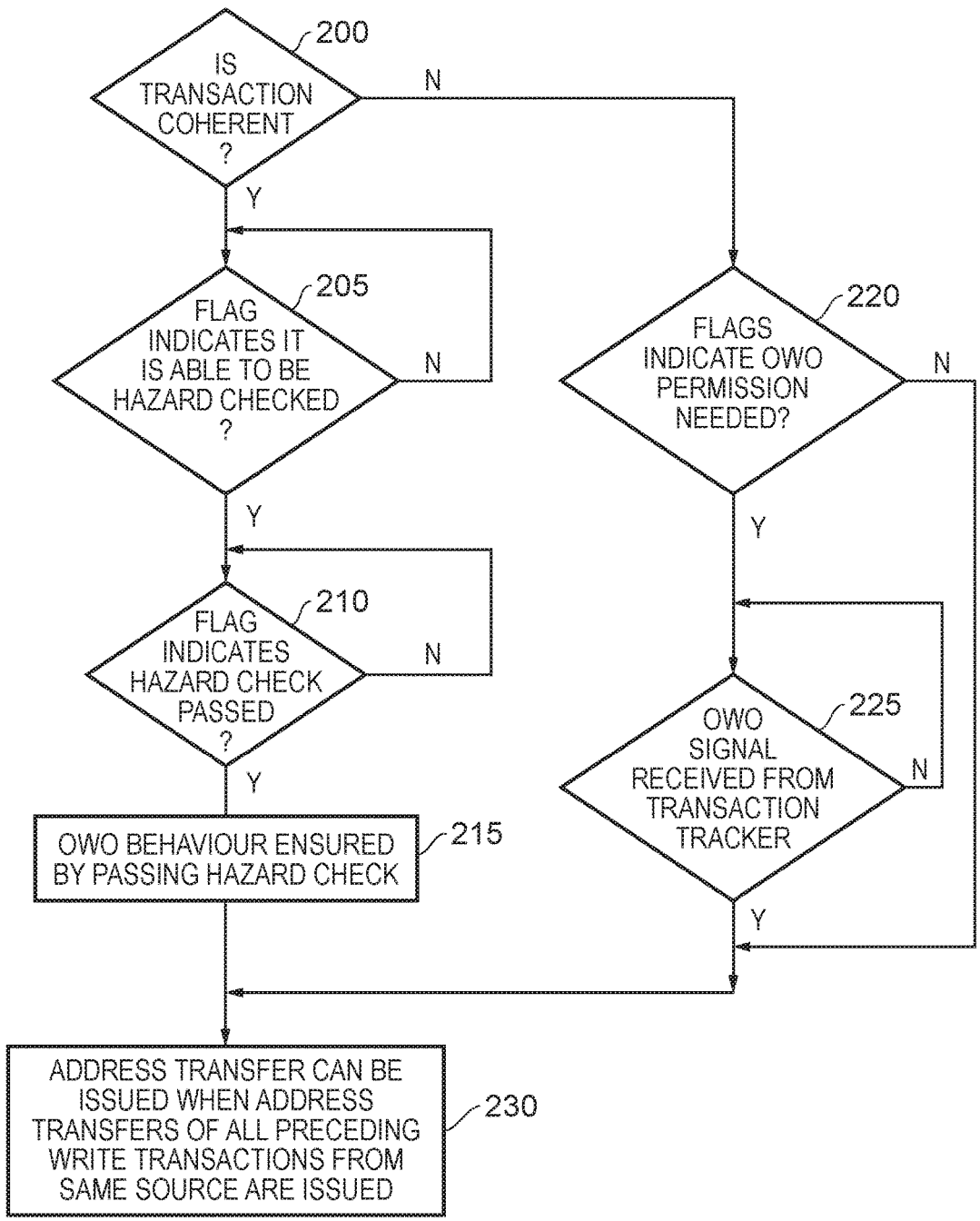
FIG. 4 is a flow diagram illustrating certain steps performed within the transaction re-order buffer of FIG. 2 in accordance with one embodiment.

FIG. 4 is a flow diagram illustrating the operation of the transaction re-order buffer 105 for each write transaction held in its buffers. At step 200, it is determined whether the transaction is coherent, and if so it is then determined at step 205 whether the relevant transaction flag 145 indicates that that transaction is able to be hazard checked. In one embodiment, the order in which hazard checking is performed for the pending transactions is important, and in particular such hazard checking needs to be performed in order for the transactions issued by a particular master device.

If the flag does indicate that the transaction under consideration is able to be hazard checked, then at step 210 it is determined whether the relevant status flag indicates that the hazard checking process for that transaction has been passed. If not, the process stalls at step 210 in respect of that transaction until the flag indicates that the hazard checking has been passed. At that point, as indicated by box 215, OWO behaviour is ensured by virtue of that transaction having passed the hazard checking process, and accordingly the process can proceed to step 230 where the address transfer of that transaction can be issued when the address transfers of preceding write transactions from the same source are issued. In one embodiment, a transaction is considered to have the same source if it is issued by the same master device. However, in an alternative embodiment, write data re-order buffers can be provided to relax this condition such that a transaction will only be considered to have the same source if it has the same transaction identifier.

If at step 200, the transaction under consideration is determined not to be coherent, then at step 220, the transaction flags 145 are referenced in order to determine whether the relevant flag indicates that OWO permission is needed for that non-coherent transaction. If not, the process can proceed directly to step 230, but assuming permission is needed, it is then determined at step 225 whether an OWO permission signal has been received from the transaction tracking circuitry 130. If not, the process stalls in respect of that transaction until the OWO signal is received, at which point the process proceeds to step 230.

In one embodiment, the write transactions issued may also include write hashing transactions, wherein the various write data units/blocks specified by the write transaction are written across multiple slave devices. A particular example of a hashing transaction is a striping transaction, where the write data units are written in a striped manner across multiple slave devices. As mentioned earlier, in one embodiment for non-coherent write transactions, OWO permission signals only need to be issued to the transaction re-order buffer in respect of a particular non-coherent write transaction if the preceding non-coherent write transaction with the same transaction identifier was to a different slave device. In one embodiment, as illustrated in FIG. 5, the non-coherent write transaction OWO tracking circuitry 130 is arranged, in situations where the preceding write transaction with the same transaction identifier is a write hashing transaction, to treat that write transaction as being in respect of a different slave device irrespective of the slave device targeted by the final unit of data within that write hashing transaction.

Figure 5:
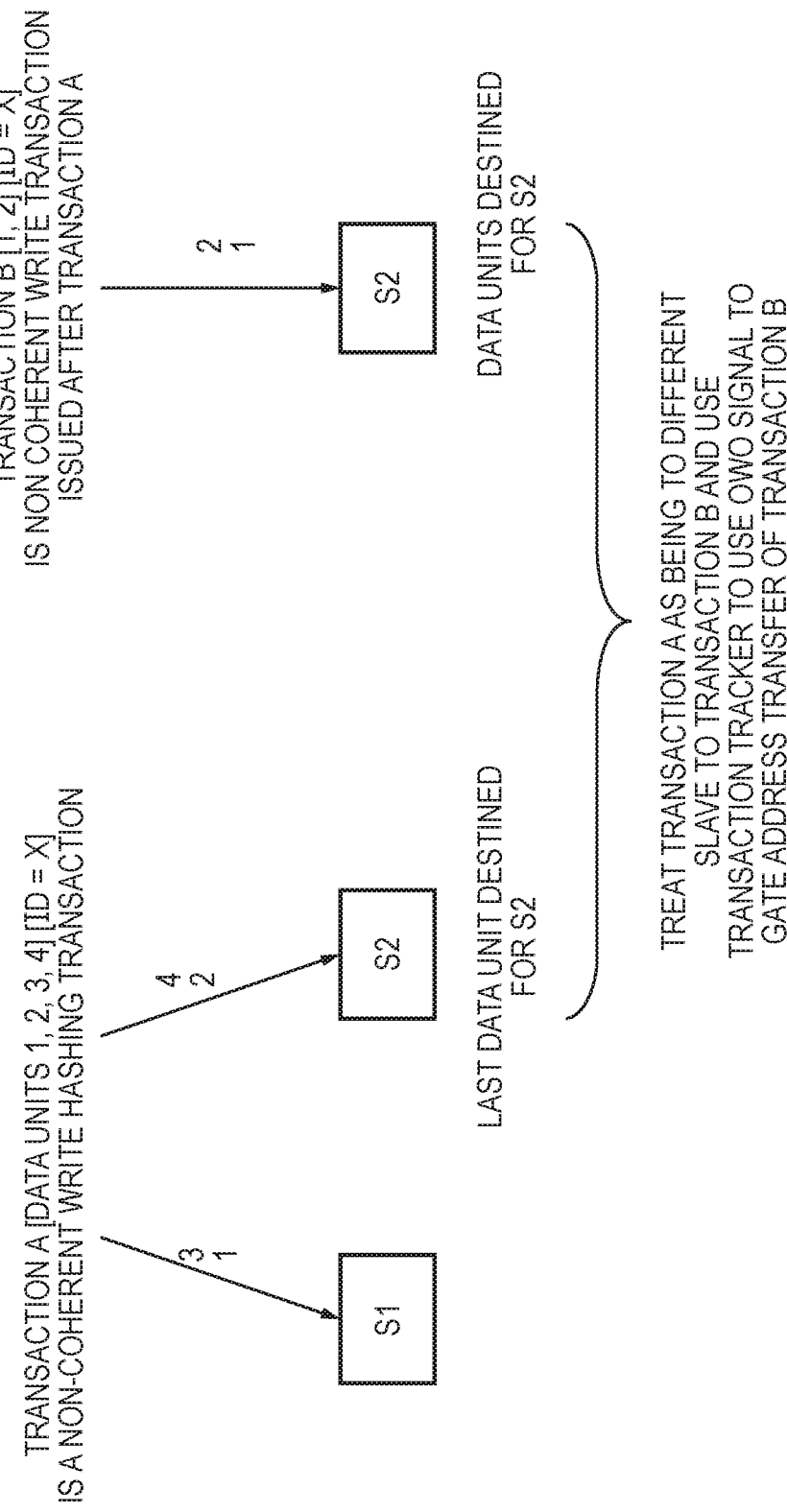
FIG. 5 is a diagram schematically illustrating how non-coherent write hashing transactions are treated for the purposes of OWO considerations in accordance with one embodiment.

In particular, as shown in FIG. 5, transaction A consists of four data units 1, 2, 3, 4 which are written in a striped manner between slave devices 1 and 2. The first and third data unit are written to slave device 1, whilst the second and fourth are written to slave device 2. Hence, the final unit of data is sent to slave device 2. If the next non-coherent write transaction (transaction B) is writing its data units all to slave device 2, then the non-coherent write transaction OWO tracking circuitry 130 will still treat transaction A as being to a different slave device to transaction B, and will accordingly set a flag indicating that transaction B needs to be gated until an OWO permission signal is issued for it. Accordingly, when employing this mechanism, a split burst transaction that was sent to multiple destinations is treated as being to a different destination from its successor transaction, regardless of the relative destinations of the last fragment of the earlier transaction and the first fragment of the later transaction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An interconnect for connecting a plurality of master devices and a plurality of slave devices, comprising:
hazard management circuitry to serialize transactions to overlapping addresses; and
gating circuitry to ensure ordered write observation (OWO) behaviour at an interface to at least one of the master devices, the gating circuitry receiving write address transfers of write transactions and performing a gating operation to gate onward propagation of the write address transfers to the slave devices in order to ensure said OWO behaviour;
the gating circuitry performing said gating operation under control of the hazard management circuitry,
wherein at least one of the master devices has an associated cache structure and the interconnect further comprises:
coherency control circuitry to perform cache coherency control operations for coherent transactions received by the interconnect from the plurality of master devices, the hazard management circuitry being provided within the coherency control circuitry and being employed to serialize coherent transactions to overlapping addresses;
the gating circuitry being arranged, for coherent write transactions, to perform said gating operation under control of the hazard management circuitry.

2. An interconnect as claimed in claim 1, further comprising:
transaction tracking circuitry to track write response signals received from the slave devices in response to write transactions issued from the interconnect to said slave devices;

for non-coherent write transactions, the transaction tracking circuitry being arranged to issue an OWO control signal to the gating circuitry to control performance of said gating operation for said non-coherent write transactions.

3. An interconnect as claimed in claim 2, wherein:
each transaction has a transaction identifier associated therewith; and
said transaction tracking circuitry is arranged to control issuance of the OWO control signal to the gating circuitry dependent on the write response signals, in order to ensure that the address transfer of a non-coherent write transaction is not propagated beyond the gating circuitry until the write response signals associated with all preceding write transactions with the same transaction identifier have been observed.

4. An interconnect as claimed in claim 3, wherein:
each slave device is constrained to implement OWO behaviour with regards to the write transactions that that slave device processes;
said transaction tracking circuitry is arranged to issue the OWO signal so as to only control propagation beyond the gating circuitry of non-coherent write transactions that are issued to a slave device that is different from the slave device of the most recently preceding non-coherent write transaction having the same transaction identifier.

5. An interconnect as claimed in claim 4, wherein:
said non-coherent write transactions include non-coherent write hashing transactions, each non-coherent write hashing transaction requiring a series of write data units to be written across multiple slave devices;
the transaction tracking circuitry is arranged when considering a current non-coherent write transaction, if the most recently preceding non-coherent write transaction having the same transaction identifier is a non-coherent write hashing transaction, to treat the current non-coherent write transaction as being issued to a slave device that is different from the slave device of that most recently preceding non-coherent write transaction.

6. An interconnect as claimed in claim 3, wherein the transaction tracking circuitry controls issuance of the OWO signal by implementing a deadlock avoidance scheme.

7. An interconnect as claimed in claim 6, wherein the deadlock avoidance scheme is one of a single transaction scheme, a single transaction per transaction identifier scheme, or a single route per transaction identifier scheme.

8. An interconnect as claimed in claim 3,
wherein for a non-coherent write transaction, if all of the preceding write transactions with the same transaction identifier whose write responses have not yet been observed are coherent write transactions, said transaction tracking circuitry is arranged not to control propagation beyond the gating circuitry of that non-coherent write transaction.

9. An interconnect as claimed in claim 1, further comprising:
a write response reorder buffer to enable write response signals received by the interconnect to be returned to the master devices in an order different to the order of receipt of said write response signals by the interconnect.

10. An interconnect as claimed in claim 1, wherein each transaction has a transaction identifier associated therewith; and said transaction tracking circuitry is arranged to control issuance of the OWO control signal to the gating circuitry dependent on the write response signals, in order to ensure that the address transfer of a non-coherent write transaction is not propagated beyond the gating circuitry until the write response signals associated with all preceding write transactions with the same transaction identifier have been observed, wherein said transaction identifiers are arranged to be different for transactions from different master devices.

11. An interconnect as claimed in claim 1, further comprising:
write data routing circuitry to route write data through the interconnect;
deadlock avoidance circuitry to gate onward propagation of write address transfers of write transactions to the slave devices in order to ensure that the write address transfer of a write transaction is not propagated beyond a gating point within the interconnect until it is guaranteed that the write data of a preceding write transaction being performed in respect of a different slave device cannot block the write transaction's associated write data within the write data routing circuitry; and
write data tracking circuitry arranged for a write address transfer of a current write transaction propagated beyond the gating point, to determine a write data size of the associated write data of that current write transaction and a write data route for the associated write data, and determine having regard to the write data route and the write data size presence of a condition that guarantees that the associated write data of that current write transaction will be propagated through the write data routing circuitry;
the write data tracking circuitry being arranged in response to detection of said condition to issue a release signal to the deadlock avoidance circuitry to allow the write address transfer of a next write transaction to pass beyond the gating point.

12. An interconnect as claimed in claim 11, further comprising:
write data buffer circuitry located between the write data routing circuitry and the slave devices for buffering write data prior to delivery to the slave devices;
the write data tracking circuitry being arranged to monitor available space within the write data buffer circuitry for the write data route in order to determine as said condition a point where the remaining write data of the current write transaction is guaranteed to be accommodated within the write data buffer circuitry.

13. An interconnect as claimed in claim 12, wherein the write data buffer circuitry comprises a separate write buffer for each slave device.

14. A method of operating an interconnect to connect a plurality of master devices and a plurality of slave devices, comprising:
employing hazard management circuitry to serialize transactions to overlapping addresses;
receiving write address transfers of write transactions;
performing a gating operation to gate onward propagation of the write address transfers to the slave devices in order to ensure ordered write observation (OWO) behaviour at an interface to at least one of the master devices; and
performing said gating operation under control of the hazard management circuitry
wherein at least one of the master devices has an associated cache structure and the method further comprises:

employing coherency control circuitry to perform cache coherency control operations for coherent transactions received by the interconnect from the plurality of master devices, the hazard management circuitry being provided within the coherency control circuitry and being employed to serialize coherent transactions to overlapping addresses;

performing said gating operation for coherent write transactions, under control of the hazard management circuitry.

15. An interconnect for connecting a plurality of master devices and a plurality of slave devices, comprising:
means for serializing transactions to overlapping addresses; and
means for ensuring ordered write observation (OWO) behaviour at an interface to at least one of the master devices, the means for ensuring also for receiving write address transfers of write transactions and for performing a gating operation to gate onward propagation of the write address transfers to the slave devices in order to ensure said OWO behaviour;
the means for ensuring also for performing said gating operation under control of the means for serializing,
wherein at least one of the master devices has an associated cache structure and the interconnect further comprises:
means for performing cache coherency control operations for coherent transactions received by the interconnect from the plurality of master devices, the means for serializing being provided within the means for performing cache coherency control operations and being employed to serialize coherent transactions to overlapping addresses;
the means for ensuring being arranged, for coherent write transactions, to perform said gating operation under control of the means for serializing.

* * * * *